United States Patent
Tinsley

(10) Patent No.: US 8,403,766 B2
(45) Date of Patent: Mar. 26, 2013

(54) PROSTHETIC APPLIANCE TRANSFER KIT AND METHOD

(75) Inventor: Christien Tinsley, Burbank, CA (US)

(73) Assignee: Tinsley Transfers, Inc., Sun Valley, CA (US)

(*) Notice: Subject to any disclaimer, the term of this patent is extended or adjusted under 35 U.S.C. 154(b) by 0 days.

(21) Appl. No.: 13/531,415

(22) Filed: Jun. 22, 2012

(65) Prior Publication Data

US 2012/0261296 A1    Oct. 18, 2012

(51) Int. Cl.
*A63J 5/02* (2006.01)
*A63J 21/00* (2006.01)

(52) U.S. Cl. .................. 472/70; 446/26; 2/206

(58) Field of Classification Search ............ 472/57, 472/70, 72, 137; 2/171, 173, 206; 156/60, 156/230, 295, 349; 446/26–28
See application file for complete search history.

(56) References Cited

U.S. PATENT DOCUMENTS

| | | | | |
|---|---|---|---|---|
| 2,975,538 | A * | 3/1961 | Murfin | 40/638 |
| 4,419,396 | A * | 12/1983 | Sugimoto | 428/40.2 |
| 4,920,580 | A | 5/1990 | Liff | |
| 5,081,853 | A * | 1/1992 | Salyer | 63/12 |
| 5,233,845 | A * | 8/1993 | D'Andrade | 63/14.9 |
| 2003/0187518 | A1 * | 10/2003 | Carls | 623/59 |
| 2009/0120565 | A1 * | 5/2009 | Marshall | 156/230 |
| 2010/0155288 | A1 * | 6/2010 | Harper et al. | 206/531 |

OTHER PUBLICATIONS http://science.discovery.com/videos/science-of-the-movies-tinsley-transfer.html; Jul. 23, 2009.
Prosthetic Transfers by Todd Debreceni; Oct. 1, 2010; downloadable at http://backporchfx.com/Tutorial1_3DTransfers.pdf.
http://www.youtube.com/watch?v=fgRnf-c45YI&feature=related; Oct. 9, 2008.
http://www.youtube.com/watch?v=Mrnjucon_Ss; Jun. 28, 2011.
http://www.youtube.com/watch?v=dpcUkmpbaWQ; Feb. 9, 2012.

* cited by examiner

*Primary Examiner* — Kien Nguyen
(74) *Attorney, Agent, or Firm* — Lance M. Pritikin, Esq.; Wolf, Rifkin, Shapiro, Schulman and Rabkin, LLP

(57) ABSTRACT

A kit and method is disclosed to facilitate the transferring of a prosthetic appliance to the skin of a wearer. The kit includes first and second transfer portions, which may be provided in combined form. The first transfer portion includes a prosthetic appliance and a release film. The second transfer portion includes a transfer substrate, an adhesive layer and a release coat therebetween. The second transfer portion may include a seal layer disposed between the adhesive layer and the release coat. The kit may include a package portion which may non-adhesively restrain the other components so as to protect and display the prosthetic while enabling the package portion to be opened without causing damage to the remainder of the kit. A method for producing the kit is disclosed and involves the use of a cavity mold and respective retainer plate to produce the requisite transfer portions.

17 Claims, 7 Drawing Sheets

PROSTHETIC APPLIANCE TRANSFER KIT AND METHOD

RELATED APPLICATIONS

Not applicable.

TECHNICAL FIELD

The present invention relates generally to three-dimensional prosthetic devices for use as components in makeup and visual special effects. More particularly, the invention relates to a kit and method for facilitating the rapid transfer of prosthetic appliances to the skin of a wearer.

BACKGROUND

Prosthetic appliances are commonly used by special effects professionals in the world of stage and screen makeup to simulate highly realistic looking deformities, injuries, unnatural features and modifications to the general structural appearance of a subject's face or body. There is a preference among many professional makeup artists to transfer certain prosthetic appliances to a subject without the need for the artist to make direct contact with the appliance at any point from its creation to its application. This is particularly important when dealing with appliances made substantially of tacky substances, such as, for example, water-based pressure-sensitive adhesives.

The Applicant previously developed prosthetic transfer solutions which remain some of the most widely-used by professional makeup artists today. In a typical such process, a prosthetic is created with an associated release film several days or weeks in advance of its application. When the time comes to apply the prosthetic to a subject, the artist applies adhesive to the front of the appliance using a sponge or brush, places a separate piece of water-slide transfer paper or water-slide fabric to the front of the appliance with the water slide coat in contact with the adhesive, the release film is removed from the back side of the appliance, the appliance is placed on the skin of the subject, the transfer paper is removed with the application of water, and the artist must manually apply a powder and/or liquid sealer to eliminate the tackiness of the prosthetic and to protect it. However, the multiple steps, materials and chemicals required in the prior known processes make creating and transferring professional-quality prosthetics too expensive, impractical, and complicated for the average consumer.

What is needed is a convenient, compact, inexpensive and easy-to-use kit for applying a prosthetic appliance to the skin of a wearer while achieving professional-quality results. Moreover, such a kit should enable the average consumer to achieve these professional results while eliminating one or more steps conventionally required of professional makeup artists. Also needed are methods for efficiently making and using such kits, while minimizing cost and complexity and optimizing the results.

SUMMARY

Certain deficiencies of the prior art may be overcome by the provision of a kit for transferring a prosthetic appliance to the skin of a wearer, and a method for using and producing such a kit. The kit may comprise a first and second transfer portion in either combined or independent form. The first transfer portion may include a prosthetic appliance and a release film. The prosthetic appliance may have an outer surface and an inner surface. The release film may have a first side and a second side, with the first side being peelably releasably bonded to the inner surface. The second transfer portion may include a transfer substrate, an adhesive layer and a water soluble release coat disposed therebetween. In certain embodiments, the second transfer portion may include a sealant layer disposed between the adhesive layer and the release coat. The first transfer portion and second transfer portion may be separably joined by way of the second side being peelably releasably bonded to the adhesive layer. Embodiments of the kit may include a multiplicity of prosthetic appliances and a package portion. Optimal methods of producing and using such a kit are also described herein.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
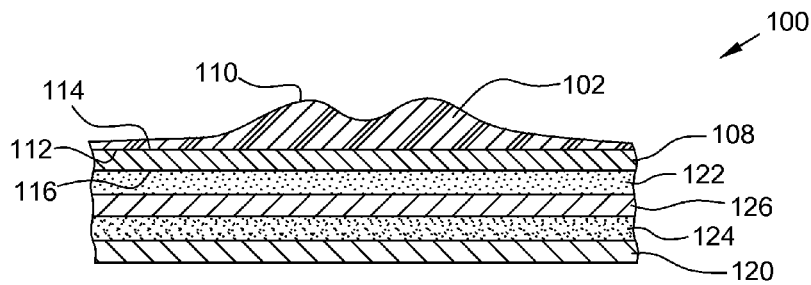
FIG. 1 is a diagrammatic partial cross-sectional view of one example of a kit in accordance with the present invention, in which the second transfer portion includes a seal layer and the first and second transfer portions are separably joined.

Referring now to the drawings, like reference numerals designate identical or corresponding features throughout the several views. Shown generally at 100 are one or more embodiments of a kit for transferring a prosthetic appliance to the skin of a wearer. Embodiments of such a kit 100 typically comprise a first transfer portion 106 and a second transfer portion 118. A first transfer portion 106 may include one or more prosthetic appliances 102 and a release film 108. A prosthetic appliance 102 may have an outer surface 110 and an inner surface 112. The release film 108 may have a first side 114 and a second side 116. The first side 114 may be peelably releasably bonded to the inner surface 112. A second transfer portion 118 may include a transfer substrate 120, an adhesive layer 122 and a release coat 124 disposed therebetween. The release coat 124 may typically be water soluble. In particular embodiments, the transfer substrate and release coat may be provided in a combined form such as water slide decal paper.

Figure 2:
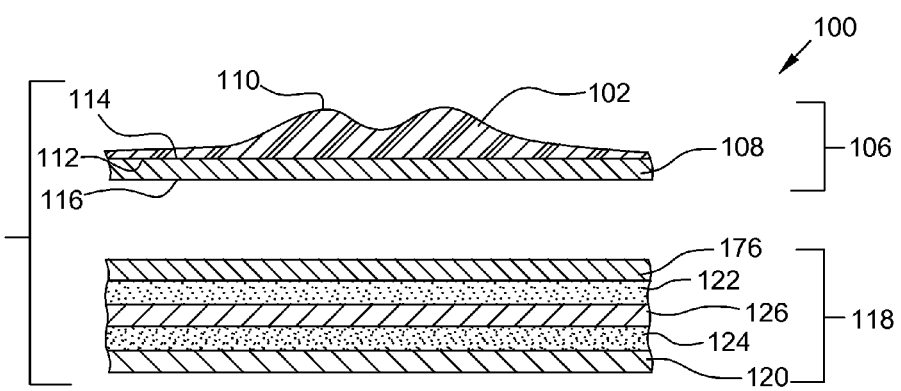
FIG. 2 is a diagrammatic partial cross-sectional view of an alternative embodiment of a kit, in which the second transfer portion includes a seal layer, the first and second transfer portions are provided in independent form, and the second transfer portion includes a second release film peelably releasably bonded to the adhesive layer.

Referring to FIGS. 1 and 2 for illustration, in particular embodiments of a kit 100, the second transfer portion 118 may include a seal layer 126 disposed between the adhesive layer 122 and the release coat 124. In particular preferred embodiments, the seal layer may be provided primarily to seal the tackiness of the side of the adhesive layer disposed outwardly from the prosthetic appliance 102 once the appliance has been applied to the wearer. In certain embodiments having a seal layer 126, the seal layer 126 may preferably be substantially water insoluble so as not to react with, or at the same time as, a release coat 124 which may itself be water soluble. In particular embodiments, the seal layer 126 may be chemically substantially similar to protective sealers conventionally used in the makeup industry in connection with, for example, prosthetic appliances. Such sealers are frequently used to seal the tackiness of residual pressure-sensitive adhesive which may remain on a prosthetic appliance after being affixed to a wearer using prior known transfer methods. More generally, depending upon the particular embodiment of a kit or method described herein, a seal layer 126 may be otherwise referred to as a protective barrier, top coat, varnish, sealer or sealant. It should be understood that, in particular embodiments, the seal layer may be formed of a sealing substance not conventionally used in the makeup arts. Also depending upon the embodiment, a seal layer 126 may be, for example, primarily water/acrylic based, alcohol/water/acrylic based, alcohol/water based, aqueous based such as sealers for paper products, a conventional makeup sealant or the like.

Figure 3:
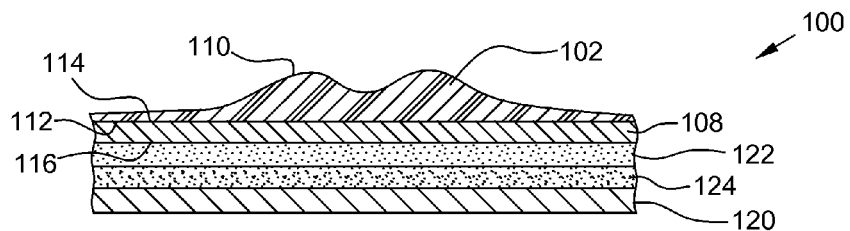
FIG. 3 is a diagrammatic partial cross-sectional view of another alternative embodiment of a kit, in which the second transfer portion does not include a seal layer and the first and second transfer portions are separably joined.
Figure 4:
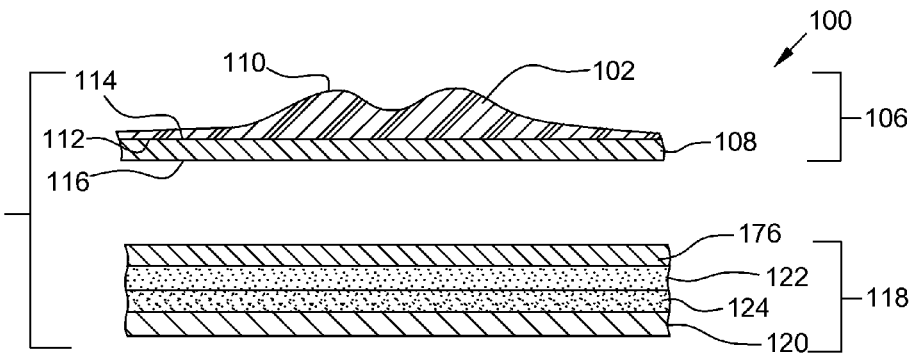
FIG. 4 is a diagrammatic partial cross-sectional view of yet a further alternative embodiment of a kit, in which the second transfer portion does not include a seal layer, the first and second transfer portions are provided in independent form, and the second transfer portion includes a second release film peelably releasably bonded to the adhesive layer.

Referring to FIGS. 3 and 4 for illustration, in particular embodiments of a kit 100, the second transfer portion 118 may not include a seal layer 126. Once prosthetic appliances 102 from such kits are affixed to the skin of a wearer, it may be desirable for a conventional makeup sealer to then be applied to the adhesive layer 122 remaining on the outer surface 110 of the prosthetic appliance 102 in order to eliminate or reduce tackiness at the outer surface.

In certain embodiments of a kit 100, such as those shown for example in FIGS. 1 and 3, the first transfer portion 106 and second transfer portion 118 may be separably joined by way of the second side 116 being peelably releasably bonded to the adhesive layer 122. In certain such embodiments, the first side 114 and second side 116 may each be treated with silicone, a similar release substance or conventional alternative. In typical preferred embodiments of a kit 100, the adhesive layer 122 may be substantially or entirely comprised of a pressure sensitive adhesive, and may be substantially transparent.

Referring to FIGS. 2 and 4 for illustration, in alternate embodiments of a kit 100, the first transfer portion 106 and second transfer portion 118 may be provided in independent form, and the second transfer portion 118 may include a second release film 176 peelably releasably bonded to the adhesive layer. In such embodiments, one or both of the release film 108 and the second release film 176 may be, for example, silicone-treated on only one side—that is, the first side 114 of release film 108 and the side of the second release film 176 which is placed in contact with the adhesive layer 122. The release film 108 and second release firm 176 may, for example, be made substantially of an acetate, a bleached paper with silicone or wax-coated barrier, or the like.

Certain embodiments of kits and methods described herein may be appropriately adapted such that the prosthetic appliance 102 may be comprised substantially of a material selected from the group consisting of, for example, water-based acrylic pressure sensitive adhesive, silicone, latex rubber, gelatin, hot melt plastic, hot melt glue, urethane foam and latex foam, similar conventionally-used prosthetic materials or a combination of one or more thereof. In certain embodiments in which the prosthetic appliance 102 is not comprised substantially of a tacky material such as a pressure sensitive adhesive (for example, if the prosthetic appliance 102 is made of latex) the first side 114 may need to be peelably releasably bonded to the inner surface 112 by way of an auxiliary adhesive layer.

In certain embodiments of a kit 100, the prosthetic appliance 102 may include a base color and one or more accent colors. The base color may be, for example, a conventional neutral prosthetic color or a selected flesh tone. An accent color, as illustrated for example, in FIG. 18 at 128, may be located substantially at the outer surface 110 of the prosthetic 102 and may be visually distinctive from the base color. Such an accent color may be, for example, a coloration simulating coagulated, oozing or spattered blood, charred flesh, exposed bone, moles, freckles, shading and the like. Accent colors may be applied by way of small paint brushes or by airbrushing.

Figure 16:
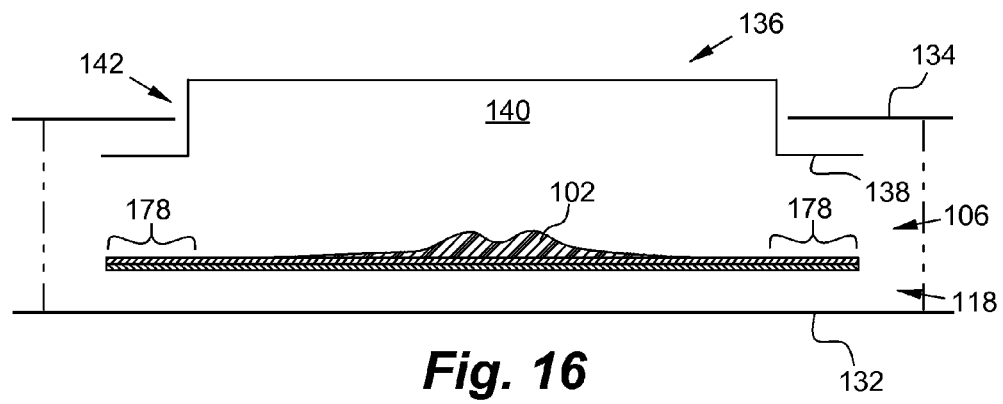
FIG. 16 is a diagrammatic partially exploded cross-sectional view of another alternative embodiment of a kit for transferring a prosthetic appliance to the skin of a wearer, in which the kit further comprises a package portion with front and rear package members and a bubble element.
Figure 17:
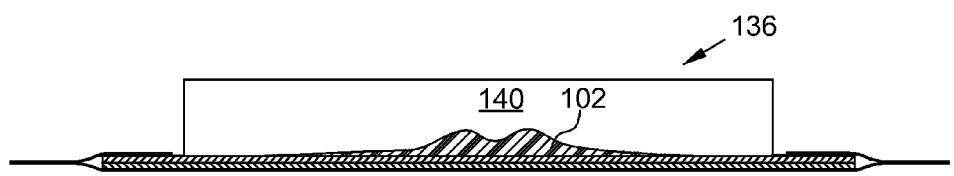
FIG. 17 is a diagrammatic cross-sectional view taken along line 17-17 in FIG. 18, depicting an embodiment of a kit similar to that shown in FIG. 16, but in collapsed, fully-assembled form.
Figure 18:
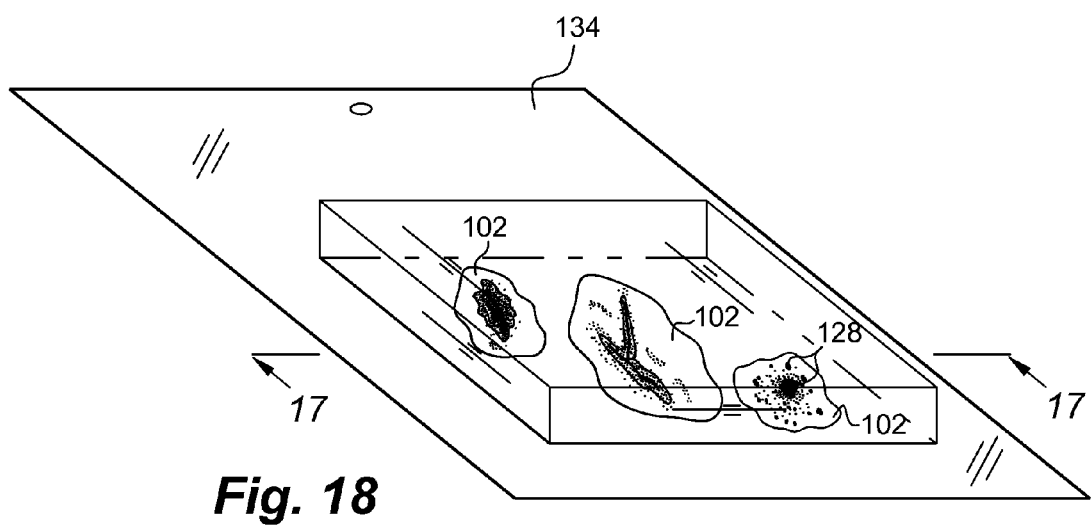
FIG. 18 is a diagrammatic perspective view of an embodiment of FIG. 17.

Referring to FIGS. 16-18 for illustration, certain embodiments of a kit 100 may further comprise a package portion. A package portion may include, for example, a rear package member 132, a front package member 134 and a bubble element 136. The bubble element 136 may be substantially transparent and have a substantially planar flange section 138 and a window compartment 140 protruding outward therefrom. The front package member 134 may have a compartment aperture 142 receiving at least a portion of the window compartment 140 substantially therethough. The front package member 132 and rear package member 132 may be adhesively joined, for example, generally at their peripheries, so as to clampingly and substantially non-adhesively secure the first and second transfer portions (106 and 118) between the flange section 138 and the rear package member 132. As a result of such securement, the prosthetic appliance(s) 102 may be substantially restrained from making contact with the package portion while remaining viewable from outward of the window compartment 140. As shown in FIG. 18, for example, a first transfer portion 106 may include a multiplicity of prosthetic appliances 102.

Prior to applying a selected prosthetic appliance, a user of a kit 100 having multiple appliances 102 may separate the selected appliance 102 from the remainder of the first transfer portion 106, for example, by carefully cutting through the first transfer portion 106 (and second transfer portion 118, in applicable embodiments such as those shown in FIGS. 1 and 3), while avoiding cutting through the thin, feathered edges of the selected appliance 102. It is envisioned that in certain alternative embodiments of a kit 100 with multiple prosthetic appliances 102, the first and second transfer portions may feature die cuts surrounding each appliance 102, such that all components of the kit corresponding to a selected prosthetic appliance 102 may be conveniently separated from the others without the need for scissors or similar cutting device.

Figure 20:
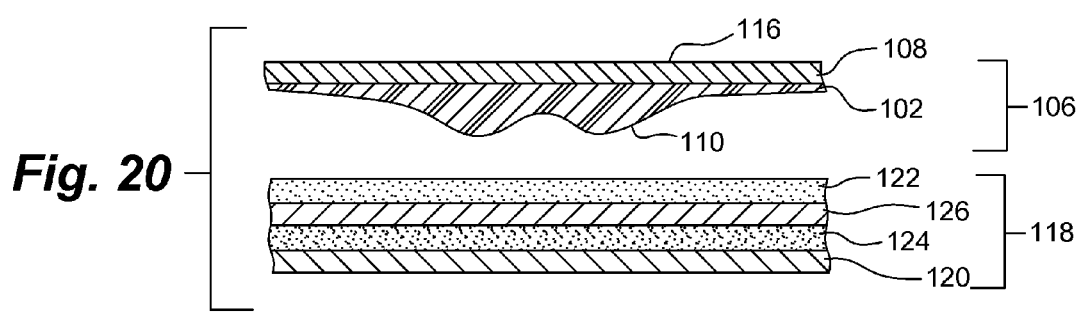
FIG. 20 is a diagrammatic partial cross-sectional view of an embodiment of a step following the step shown in FIG. 19, in which the first transfer portion is flipped over with respect to the second transfer portion in preparation for a step of applying the adhesive layer to the outer surface of a prosthetic appliance.
Figure 21:
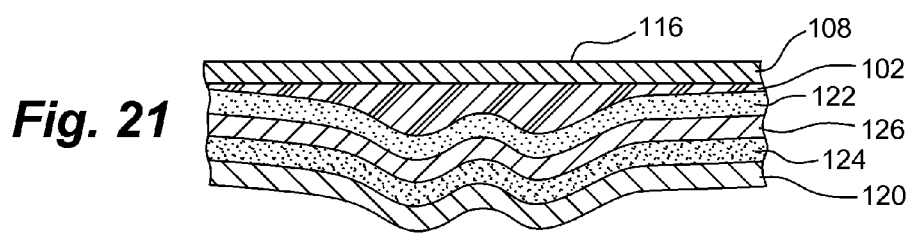
FIG. 21 is a diagrammatic partial cross-sectional view of an embodiment of a step following the step shown in FIG. 20, in which the adhesive layer is shown applied to the outer surface of the prosthetic appliance.
Figure 22:
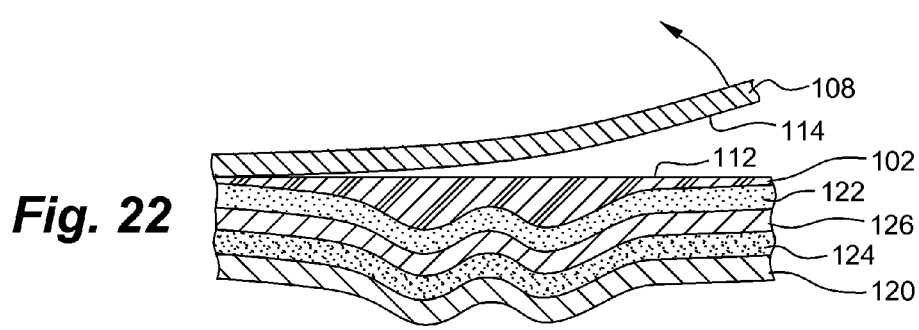
FIG. 22 is a diagrammatic partial cross-sectional view of an embodiment of a step following the step shown in FIG. 21, in which the release film is shown being peeled from the inner surface of the prosthetic appliance.
Figure 23:
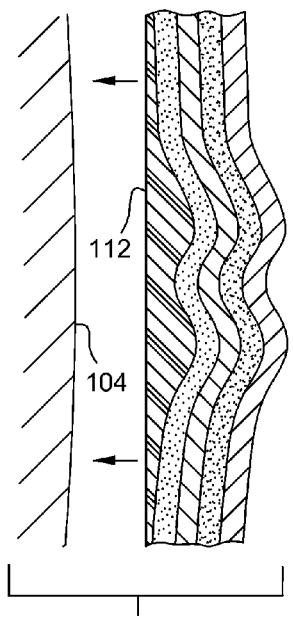
FIG. 23 is a diagrammatic partial cross-sectional view of an embodiment of a step following the step shown in FIG. 22, in which the inner surface of the prosthetic appliance is ready to be affixed to the skin of a wearer.
Figure 24:
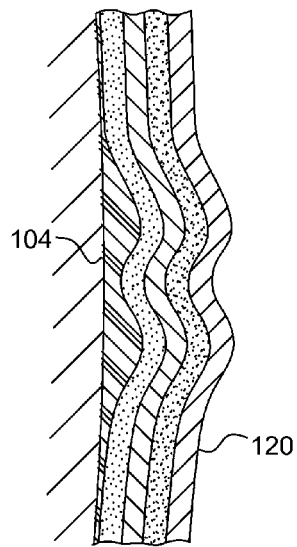
FIG. 24 is a diagrammatic partial cross-sectional view of an embodiment of a step following the step shown in FIG. 23, in which the inner surface of the prosthetic appliance has been affixed to the skin of a wearer.
Figure 25:
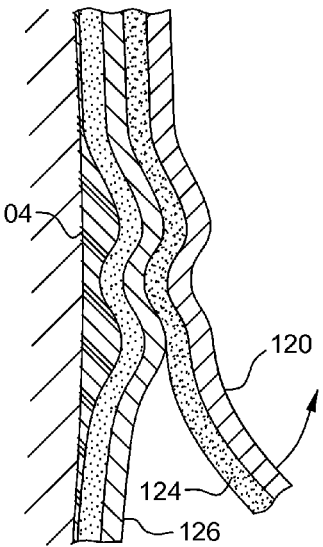
FIG. 25 is a diagrammatic partial cross-sectional view of an embodiment of a step following the step shown in FIG. 24, in which water has been administered to the transfer substrate, makes contact with the release coat, and thereby allows the transfer substrate to be removed.
Figure 26:
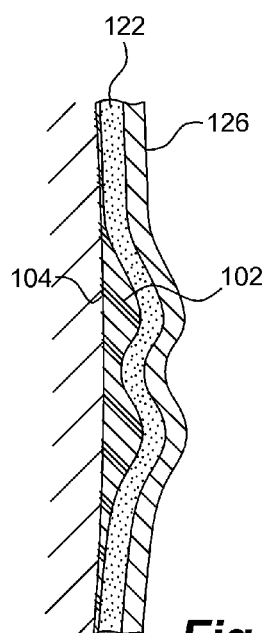
FIG. 26 is a diagrammatic partial cross-sectional view of an embodiment of a step following the step shown in FIG. 25, in which the transfer substrate has been removed.
Figure 27:
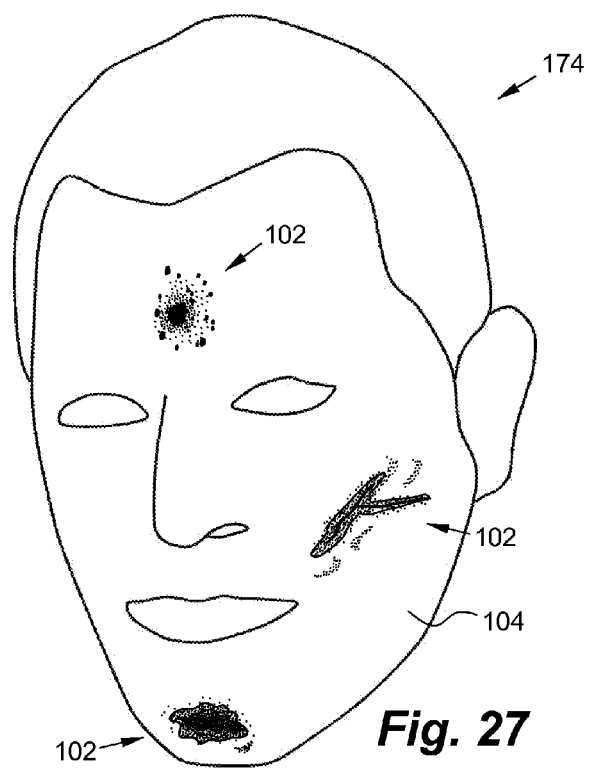
FIG. 27 is a diagrammatic perspective view of a wearer with prosthetic appliances having been applied to his skin in accordance with the present invention.

Embodiments of a method for transferring a prosthetic appliance 102 to the skin 104 of a wearer 174 may comprise one or more of the following steps, which are listed here generally in the order of certain preferred and non-exhaustive embodiments. First, referring for example to FIGS. 1 and 19, there may be provided a first transfer portion 106 and a second transfer portion 118 in the form of a kit. The first transfer portion 106 may include a prosthetic appliance 102 and a release film 108. The prosthetic appliance 102 may have an outer surface 110 and an inner surface 112. The release film 108 may have a first side 114 and a second side 116. The first side 114 may be in peelably releasably bonded engagement with the inner surface 112. The second transfer portion 118 may include a transfer substrate 120, an adhesive layer 122, and a release coat 124 disposed therebetween. The release coat 124 may be, for example, water soluble. Subsequent steps typically include the following: applying the adhesive layer 122 to the outer surface 110 (see, for example, FIGS. 20 and 21); peeling the release film 108 from the inner surface 112 (see, for example, FIG. 22); affixing the inner surface 112 to the skin 104 of the wearer 174 (see, for example, FIGS. 23 and 24); administering water to the transfer substrate 120; and removing the transfer substrate (see, for example, FIGS. 25 and 26). Ultimately, a primary objective of the transfer method is to provide a convenient means to affix the prosthetic appliance to the skin of a wearer without requiring a person to directly touch the prosthetic appliance in the process.

Referring again to FIGS. 20 and 21, in particular embodiments of a transfer method, the step of applying the adhesive layer 122 to the outer surface 110 may result in only a portion of the outer surface 110 coming into direct contact with the adhesive layer 122. For example, to the extent that the prosthetic appliance 102 features deep recesses, the adhesive layer 122 may not make contact with the floor or parts of the inner walls of those recesses.

In particular embodiments of a method for transferring a prosthetic appliance 102 to the skin 104 of a wearer 174, the second transfer portion 118 may be provided to include a seal layer 126 disposed between the adhesive layer 122 and the release coat 124. Such a seal layer 126 may be, for example, substantially water insoluble and substantially transparent. In embodiments in which the second transfer portion includes a seal layer, it may be preferable for the seal layer to be substantially water insoluble so as not to dissolve when water is administered to the transfer substrate. As illustrated for example in FIG. 26, embodiments of a method for transferring a prosthetic appliance may preferably result in the seal layer 126 conveniently pre-sealing the tackiness of the adhesive layer 122. Both the adhesive and sealer layers may preferably be substantially transparent so that the outer surface 110 of the prosthetic appliance 102 may remain visually unobstructed.

Figure 19:
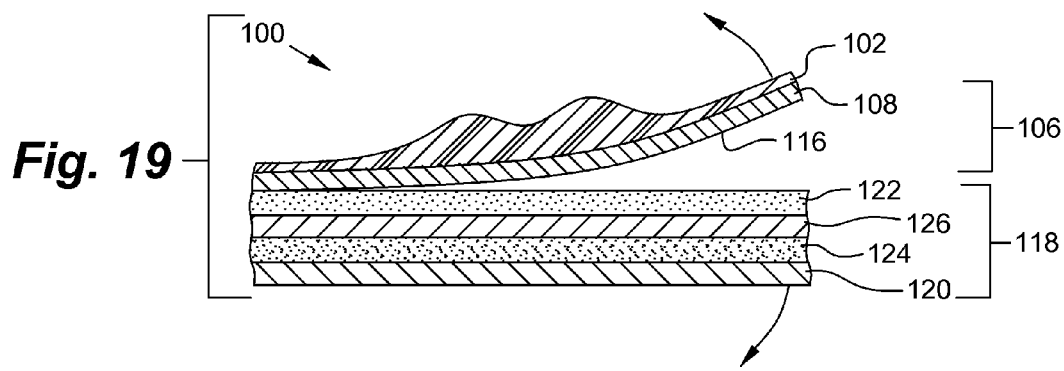
FIG. 19 is a diagrammatic partial cross-sectional view of an embodiment of a kit for transferring a prosthetic appliance to the skin of a wearer, illustrating a step of peelingly separating a second transfer portion from a respective first transfer portion.

In certain embodiments of a method for transferring a prosthetic appliance to the skin of a wearer, in the step of providing, the first transfer portion 106 and second transfer portion 118 may be in peelingly separable bonded engagement with one another, wherein the peelingly separable bonded engagement may be, directly or indirectly, between the second side 116 and the adhesive layer 122. In such embodiments, for example, both the first side 114 and second side 116 may each be silicone treated. Referring to FIG. 19 for illustration, particular such embodiments may further comprise the step of peelingly separating the second transfer portion 118 from the first transfer portion 106 prior to the step of applying the adhesive layer 122 to the outer surface 110 of the prosthetic appliance 102.

Figure 5:
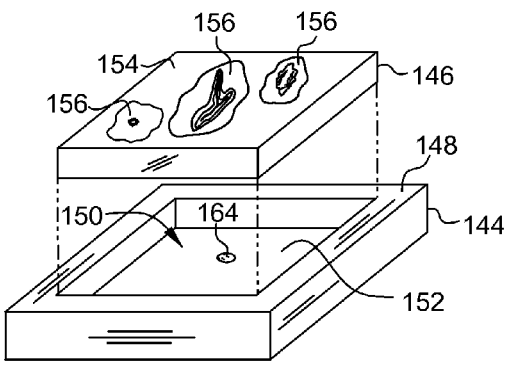
FIG. 5 is a diagrammatic perspective view illustrating an embodiment of a cavity mold removed from a respective retainer plate.

Embodiments of a method for producing a kit 100 for transferring a prosthetic appliance 102 to the skin 104 of a wearer 174 may comprise one or more of the following steps, which are listed here generally in the order of certain non-exhaustive preferred embodiments. This order may be modified as appropriate. First, there may be provided a release film 108 and a second transfer portion 118. The release film 108 may have a first side 114 and a second side 116. The second transfer portion 118 may include a transfer substrate 120, an adhesive layer 122 and a release coat 124 disposed therebetween. The release 124 coat may be, for example, water soluble. Referring to FIG. 5 for illustration, a subsequent step may involve selecting a retainer plate 144 and a cavity mold 146. The retainer plate 144 may be rigid and may have a guide face 148 and a mold pocket 150 extending generally from the guide face 148 toward a pocket floor 152.

Figure 6:
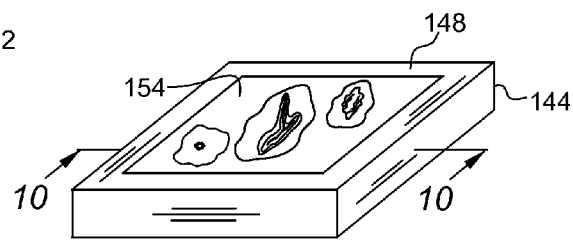
FIG. 6 is a diagrammatic perspective view similar to that of FIG. 5, but wherein the retainer plate is shown in releasable receipt of the cavity mold.
Figure 10:
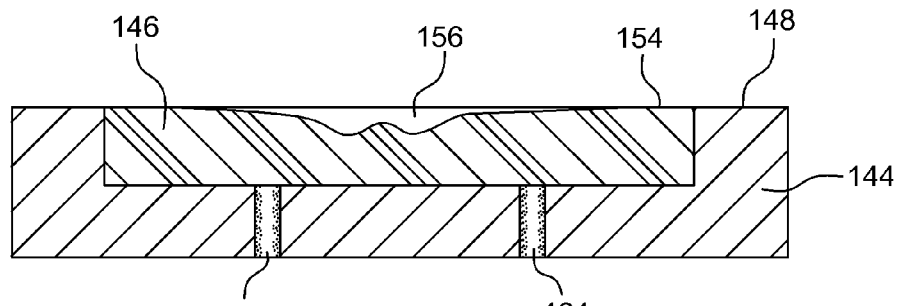
FIG. 10 is a diagrammatic cross-sectional view taken along line 10-10 in FIG. 6, wherein the prosthetic cavity is shown empty and ready to receive prosthetic precursor fluid.

A cavity mold 146 may be generally flexible and may have an outer face 154 and one or more prosthetic cavities 156 extending generally inward therefrom. The cavity mold 146 may be made of, for example, a silicone, a flexible urethanes, a mold injected plastic or the like. The material of the cavity mold 146 must generally be appropriately matched to the material used to form the prosthetic appliance 102, particularly insofar as mold release properties and the presence of mold undercuts are concerned. For example, a particular prosthetic appliance 102 may require a mold having undercuts, the requiring a more flexible and elastic cavity mold material in order to allow for proper extraction of the prosthetic without causing it to become damaged during extraction. Referring to FIGS. 6 and 10 for illustration, the retainer plate 144 may be adapted to releasably receive the cavity mold 146 therein such that the outer face 154 is substantially coplanar with the guide face 148.

Figure 7:
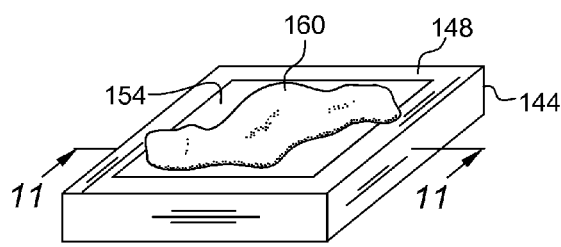
FIG. 7 is a perspective view depicting an embodiment of a step following the step shown in FIG. 6, wherein a volume of prosthetic precursor fluid has been inserted into the prosthetic cavities of the cavity mold.
Figure 8:
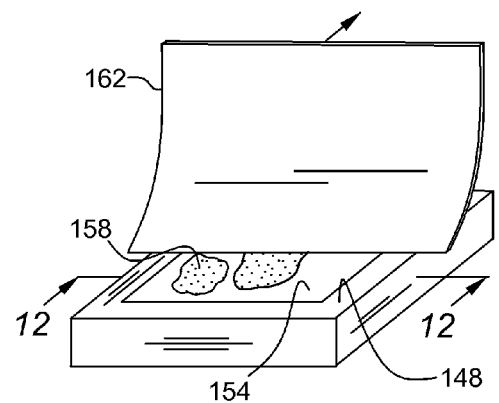
FIG. 8 is a perspective view depicting an embodiment of a step following the step shown in FIG. 7, wherein a squeegee is shown being dragged across the outer face of the cavity mold while simultaneously remaining in contact with the guide face of the retainer plate, thereby scraping precursor excess from the cavity mold while particularly ensuring removal of substantially any residual prosthetic material from the guide face.
Figure 11:
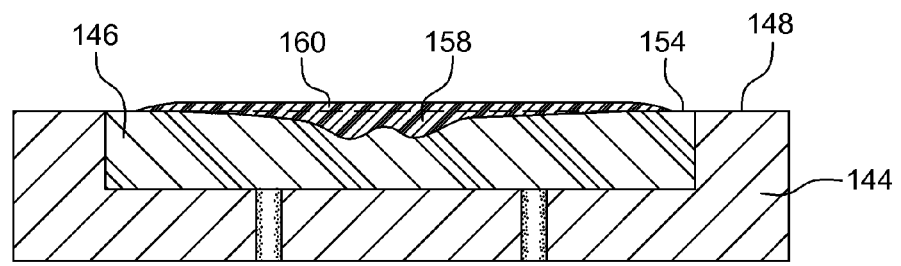
FIG. 11 is a diagrammatic cross-sectional view taken along line 11-11 in FIG. 7, a dashed line being provided to help illustrate the distinction between the prosthetic precursor within the prosthetic cavity and the precursor excess generally thereabove.
Figure 12:
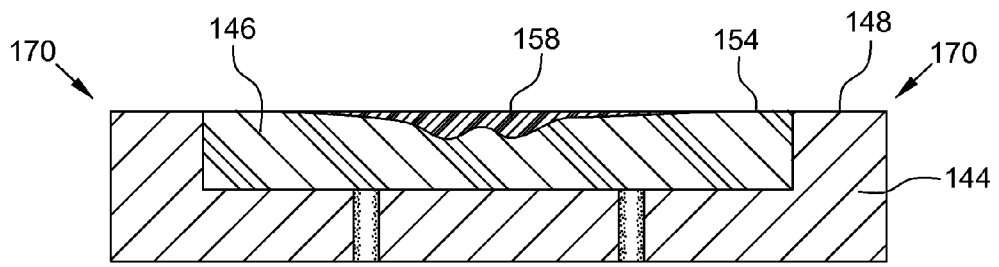
FIG. 12 is a diagrammatic cross-sectional view taken along line 12-12 in FIG. 8, illustrating the precursor excess having been scraped from the cavity mold while removing substantially any residual prosthetic material from the guide face.

Referring now to FIG. 7 for illustration, embodiments of a method for producing a kit 100 may further include the step of inserting a volume of a prosthetic precursor fluid into the one or more prosthetic cavities 156, thereby forming respective prosthetic precursors 158 within each prosthetic cavity 156, and precursor excess 160 generally thereabove (see, for example, FIG. 11). Referring to FIGS. 8 and 12 for illustration, a further step may involve scraping the precursor excess 160 from the cavity mold 146 by dragging a squeegee 162 across the outer face 154 while the squeegee 162 remains in contact with the guide face 148.

Figure 14:
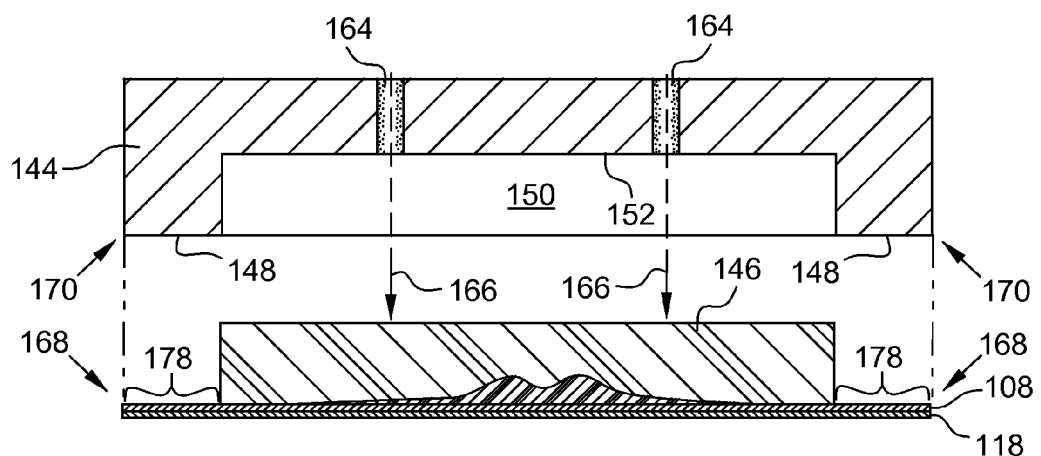
FIG. 14 is a cross-sectional view depicting an embodiment of a step of ejecting a cavity mold from a respective retainer plate, which may follow the step illustrated in FIG. 13.

In particular preferred embodiments, the retainer plate 144 is substantially rigid, and may be constructed from a rigid urethane, or other rigid material such as stone, plastics, silicones and the like. Due to the rigidity of a preferred retainer plate 144, particularly relative to that of a respective preferred cavity mold 146, pressure applied to the guide face 148 by the squeegee 162 during the squeegeeing step may be substantially prevented from compressing or deforming the guide face 148. This may provide at least two potential benefits. First, it may protect a softer and more compressible cavity mold 146 from being depressed by the squeegee 162 during the scraping operation, thereby helping to maintain the integrity of the prosthetic precursors 158 within the cavity mold 146. Second, it may help ensure that substantially all of the residual prosthetic material is removed from the guide face 148 prior to the release film 108 being brought into contact with the guide face 148. Referring to FIG. 14 for illustration, the later discussed benefit may help provide the first transfer portion 106 with a substantially prosthetic-free zone 178, therefore allowing a kit 100 to incorporate a package portion while preventing any part of that package from sticking to a prosthetic appliance 102 or any other part of the first or second transfer portions. FIGS. 16 and 17, for example, illustrate how a package portion may be adapted to interact with the other components of a kit 100, wherein the substantially prosthetic-free zone 178 allows the flange section 138 of the bubble element 136 to make direct contact with the first transfer portion 106 while ensuring that such contact remains non-adhesive. Thus, the packaging can later be opened by an average consumer without such opening causing damage to the prosthetic appliances inside.

Figure 9:
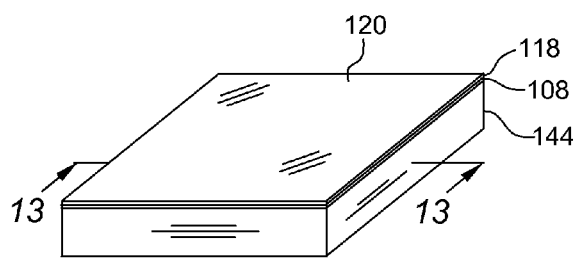
FIG. 9 is a perspective view depicting an embodiment of a step following the step shown in FIG. 8, wherein a release film is applied across the guide face with the first side in contact with the prosthetic precursor, and in the embodiment shown, the first and second transfer portions have been provided peelably separably bonded to one another.
Figure 13:
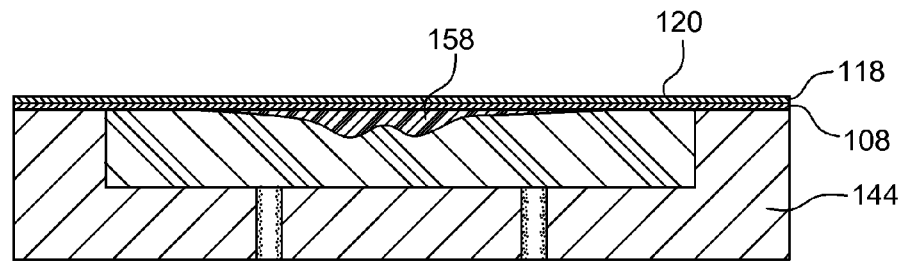
FIG. 13 is a diagrammatic cross-sectional view taken along line 13-13 in FIG. 9, showing a configuration in which the system shown may be frozen for a specified period of time in order to allow the prosthetic precursor to harden and become peelably releasably bonded to a transfer film.

Referring to FIGS. 9 and 13, in embodiments of a method for producing a kit 100, following the step of scraping for example, a release film 108 may then be applied across the guide face 148 with the first side 114 being placed in contact with the prosthetic precursor 158. In certain preferred embodiments, the release film 108 and the second transfer portion 118 are provided in combined form prior to being applied across the guide face. In particular embodiments, once the step of applying the release film 108 has been performed, the prosthetic precursor 158 may be allowed to cure within the prosthetic cavity 156, thereby transforming the prosthetic precursor 158 and release film 108 into a first transfer portion 106. Referring to FIGS. 1-4 for alternative illustrations, the step of allowing the prosthetic precursor 158 to cure may thereby transform the prosthetic precursor 158 and release film 108 into a first transfer portion 106 including at least a prosthetic appliance 102 and a release film 108, wherein the prosthetic appliance 102 has an outer surface 110 and an inner surface 112, and the first side 114 is peelably releasably bonded to the inner surface 112. Referring to FIG. 14 for illustration, the cavity mold 146 may then be ejected from the retainer plate 144, and, referring to FIG. 15 for example only, the first transfer portion 106 extracted from the cavity mold 146.

In particular embodiments of a method for producing a kit 100, the curing of the prosthetic precursor 158 may be accomplished, at least in part, by way of cooling or freezing the prosthetic precursor 158. For example, the combined retainer plate 144, cavity mold 146, prosthetic precursor 158 and release film 108 (and second transfer portion 118, in respective embodiments) may be cooled or frozen for a selected cooling period.

As previously mentioned, in certain embodiments, the prosthetic appliance 102 may not be comprised substantially of a tacky material such as a pressure sensitive adhesive (for example, when the prosthetic appliance 102 is made of latex or the like). In such embodiments, the first side 114 of the release film 108 may be peelably releasably bonded to the inner surface 112 of the prosthetic appliance 102 by way of, for example, an auxiliary adhesive layer. One way to achieve this is to apply the auxiliary adhesive layer to the release film 108 or to the inner surface 112 prior to applying the release film 108 to the non-tacky prosthetic. The auxiliary adhesive layer may be applied by brushing, spray operation, or other conventional means of applying adhesive layers. An auxiliary adhesive layer may also result in the establishment of a tacky surface on the inner surface 112 of an otherwise substantially non-tacky prosthetic appliance, thereby facilitating the step of affixing of such a prosthetic appliance 102 to the skin 104 of a wearer 174.

Referring to FIG. 14 for illustration, in certain embodiments of a method for producing a kit 100, the retainer plate 144 may include at least one ejector port 164 in fluid communication with the pocket floor 152. In particular such embodiments, the step of ejecting the cavity mold 146 may be facilitated by way of the at least one ejector port 164 and an ejection force (depicted, for example, at 166) imposed on the cavity mold 146. The ejection force 166 may be, for example, at least partially imposed by way of pressurized gas flowing through the at least one ejector port 164. Alternatively or in addition, the ejection force may be imposed by way of ejector pins (not shown) actuated through one or more ejector ports. In further embodiments, the ejection force may be imposed, in total or in part, by way of gravity, wherein, for example, the retainer plate is at least partially invented (as shown, for example, in FIG. 14) and one or more ejector ports 164 allow ambient air to flow therethrough to prevent suction from retaining the cavity mold 146 within the mold pocket 150.

Figure 15:
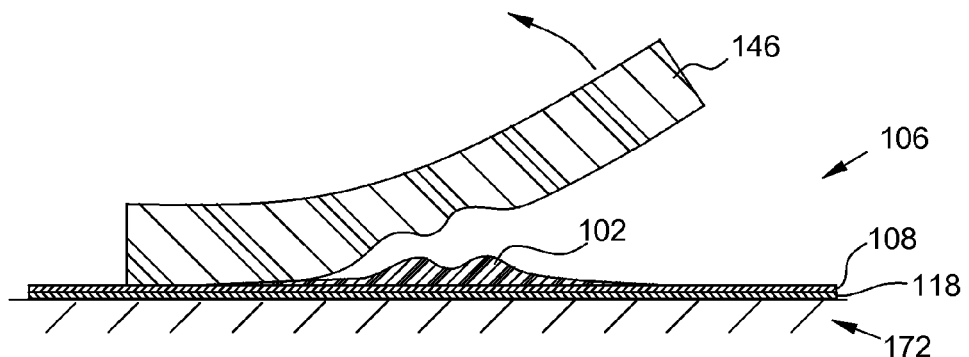
FIG. 15 is a cross-sectional view depicting an embodiment of a step of extracting the first transfer portion from the cavity mold by bendingly pealing the cavity mold from the first transfer portion.

Referring to FIG. 15 for illustration, in certain embodiments of a method for producing a kit 100, the step of extracting may include bendingly peeling the cavity mold 146 from the first transfer portion 106. Such a peeling operation may be performed, for example, with the first transfer portion 106 being supported, directly or indirectly, by a substantially rigid working surface 172. In certain distinct or further related embodiments, in the step of providing a release film 108 and a second transfer portion 118, the second side 116 may be in peelingly separable bonded engagement with the adhesive layer 122.

Referring to FIGS. 12 and 14 for illustration, in certain embodiments of a method for producing a kit 100, the release film 108 may include at least a pair of laterally opposed film edges 168, the guide face 148 may include at least a pair of laterally opposed guide edges 170, and the step of applying may be performed to result in each of the film edges 168 being substantially adjacently aligned with a respective one of the guide edges 168. As illustrated in FIGS. 9 and 13, in such embodiments, the size and shape of the release film 108 may be adapted to closely match the size and shape of the outer periphery of the guide face 148. Referring more specifically to FIG. 9 for illustration, in the same or further embodiments, the entire peripheral edge of the guide face 148 may be adapted to respectively match the entire peripheral edge of a selected release film 108 and second transfer portion 118, as appropriate.

Particular embodiments of a method for producing a kit 100 may further comprise a step of preparing the prosthetic precursor fluid prior to the step of inserting the fluid into the one or more prosthetic cavities 156. This step of preparing may include one or more of the following sub-steps, which are listed here in one non-exhaustive example of a preferred order: measuring a first weight of a prosthetic base liquid; stirring the first weight for a first period; adding a second weight of a plasticizer to the first weight; mixing the first weight with the second weight for a second period, thereby forming a precursor mix; and purifying the precursor mix by way of transferring the precursor mix through a strainer. In particular embodiments, the prosthetic base liquid may be a water-based pressure sensitive adhesive. In such an embodiment, the second weight may be, for example, approximately 4.2% of the first weight. However, depending upon the firmness required for the final appliance, various embodiments may be practiced in which the second weight of plasticizer may range from 0.001% to 20% of the first weight. In certain embodiments, the second period may be at least 20 hours. In other embodiments, the second period may be greater than 20 hours. In various preferred embodiments, depending upon the desired resulting viscosity of the precursor fluid, the second period may range between 6 hours and 24 hours. Generally, the longer the second period, the greater the resulting viscosity.

In a particular embodiment of a step of preparing the prosthetic precursor fluid, the first weight may be approximately 600 grams of a conventional prosthetic base liquid (for example, a water-based acrylic pressure sensitive adhesive), and the second weight may be approximately 25 grams of a conventional Plasticizer. In such a step, the prosthetic base liquid may be first mixed for a first period of approximately 30 minutes, and then the plasticizer added to the base liquid over the course of approximately one minute while pouring slowly. The mixer may then be left to run for a second period of approximately or at least 20 hours depending on the desired moisture loss, thus forming an aforementioned precursor mix. The finished product of such an embodiment may yield, for example, approximately 375 grams of precursor mix, which may then be optionally purified by transferring the precursor mix through a strainer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A kit for transferring a prosthetic appliance to the skin of a wearer, said kit comprising:
   a first transfer portion including a prosthetic appliance and a release film, said prosthetic appliance having an outer surface and an inner surface, said release film having a first side and a second side, said first side being peelably releasably bonded to said inner surface; and
   a second transfer portion including a transfer substrate, an adhesive layer and a water soluble release coat disposed therebetween.

2. A kit as defined in claim 1 in which said second transfer portion includes a seal layer disposed between said adhesive layer and said release coat.

3. A kit as defined in claim 2 in which said seal layer is substantially water insoluble.

4. A kit as defined in claim 1 in which said first transfer portion and said second transfer portion are separably joined by way of said second side being peelably releasably bonded to said adhesive layer.

5. A kit as defined in claim 4 in which said first side and said second side are each silicone treated.

6. A kit as defined in claim 1 in which said adhesive layer is substantially comprised of a pressure sensitive adhesive.

7. A kit as defined in claim 1 in which said prosthetic appliance is comprised substantially of a material selected from the group consisting of water-based acrylic pressure sensitive adhesive, silicone, latex rubber, gelatin, hot melt plastic, hot melt glue, urethane foam and latex foam.

8. A kit as defined in claim 1 in which said prosthetic appliance includes a base color and an accent color, said accent color being substantially at said outer surface and being visually distinctive from said base color.

9. A kit as defined in claim 1 in which said first transfer portion includes a multiplicity of said prosthetic appliances.

10. A kit as defined in claim 1 further comprising a package portion, said package portion including a rear package member, a front package member, and a bubble element, said bubble element being substantially transparent and having a substantially planar flange section and a window compartment protruding outward therefrom, said front package member having a compartment aperture receiving at least a portion of said window compartment substantially therethough, said front and rear package members being adhesively joined so as to clampingly and substantially non-adhesively secure said first and second transfer portions between said flange section and said rear package member, wherein said prosthetic appliance is substantially restrained from making contact with said package portion and remains viewable from outward of said window compartment.

11. A kit for transferring a prosthetic appliance to the skin of a wearer, said kit comprising:
- a first transfer portion including a prosthetic appliance and a release film, said prosthetic appliance having an outer surface and an inner surface, said release film having a first side and a second side, said first side being peelably releasably bonded to said inner surface; and
- a second transfer portion including a transfer substrate, an adhesive layer, a water soluble release coat disposed therebetween and a seal layer disposed between said adhesive layer and said release coat, said adhesive layer being substantially comprised of a pressure sensitive adhesive;
- wherein said first transfer portion and said second transfer portion are separably joined by way of said second side being peelably releasably bonded to said adhesive layer.

12. A method for transferring a prosthetic appliance to the skin of a wearer, said method comprising the steps of:
- providing a first transfer portion and a second transfer portion, said first transfer portion including a prosthetic appliance and a release film, said prosthetic appliance having an outer surface and an inner surface, said release film having a first side and a second side, said first side being in peelably releasably bonded engagement with said inner surface, said second transfer portion including a transfer substrate, an adhesive layer and a water soluble release coat disposed therebetween;
- applying said adhesive layer to said outer surface;
- peeling said release film from said inner surface;
- affixing said inner surface to the skin of said wearer;
- administering water to said transfer substrate; and
- removing said transfer substrate.

13. A method as defined in claim 12 in which said second transfer portion includes a seal layer disposed between said adhesive layer and said release coat.

14. A method as defined in claim 13 in which said seal layer is substantially water insoluble.

15. A method as defined in claim 12 in which, in said step of providing, said first transfer portion and said second transfer portion are in peelingly separable bonded engagement with one another, wherein said peelingly separable bonded engagement is between said second side and said adhesive layer.

16. A method as defined in claim 15 in which said first side and said second side are each silicone treated.

17. A method as defined in claim 15 further comprising the step of peelingly separating said second transfer portion from said first transfer portion prior to said step of applying.

* * * * *